United States Patent [19]

Zirk

[11] Patent Number: 4,643,407

[45] Date of Patent: Feb. 17, 1987

[54] MECHANICAL SYSTEM COMPRISING TWO FACES MOVABLE WITH RESPECT TO EACH OTHER, AND A LUBRICANT THEREBETWEEN

[75] Inventor: Wolfgang Zirk, Dittelbrunn, Fed. Rep. of Germany

[73] Assignee: Fichtel & Sachs AG, Schweinfurt, Fed. Rep. of Germany

[21] Appl. No.: 628,258

[22] Filed: Jul. 6, 1984

[30] Foreign Application Priority Data

Jul. 8, 1983 [DE] Fed. Rep. of Germany ....... 3324648

[51] Int. Cl.$^4$ ............................ F16F 9/04; F16F 9/08; F16N 15/00
[52] U.S. Cl. .............................. 267/64.27; 267/64.24; 267/122; 267/182
[58] Field of Search ............... 267/64.21, 64.19, 64.24, 267/64.23, 64.27, 122, 64.11, 182; 188/269, 298, 264 B; 252/9, 12, 12.2, 15; 92/155, 153, 98 D, 100, 103, 83; 152/158, 2; 280/711; 277/205, 212 FB, 172

[56] References Cited

U.S. PATENT DOCUMENTS

| | | | |
|---|---|---|---|
| 3,043,582 | 7/1962 | Hirtreiter | 267/64.24 |
| 3,157,396 | 11/1964 | Long, Jr. | 267/64.24 |
| 3,373,694 | 3/1968 | Taplin | 92/98 D |
| 3,627,298 | 12/1971 | Gaydecki | 267/64.24 |
| 3,797,816 | 3/1974 | Voss | 267/64.24 |
| 4,263,953 | 4/1981 | Miceli | 152/158 |
| 4,299,399 | 11/1981 | Haaland | 277/172 X |
| 4,489,474 | 12/1984 | Brown et al. | 267/64.21 X |

FOREIGN PATENT DOCUMENTS

| | | |
|---|---|---|
| 1359461 | 7/1974 | United Kingdom . |
| 1434732 | 5/1976 | United Kingdom . |
| 1474336 | 5/1977 | United Kingdom . |
| 2004234 | 3/1979 | United Kingdom . |
| 1566332 | 4/1980 | United Kingdom . |

OTHER PUBLICATIONS

"Pharmazie in unserer Zeit", published by Verlag Chemie GmbH, D-6940 Weinheim, May 1984, pp. 71-82.

*Primary Examiner*—Douglas C. Butler
*Attorney, Agent, or Firm*—Walter Ottesen

[57] ABSTRACT

A pneumatic spring for motor vehicles comprises a bellows. Adjacent portions of the bellows overlap each other. These adjacent portions are normally maintained at a distance from each other. Under certain conditions the faces touch each other. In such a case, considerable friction and wear occur between adjacent faces. In order to reduce such wear, a lubricant is provided. In order to prohibit undesirable effects of the presence of the lubricant, particularly with respect to the fixation of the bellows to adjacent parts of the pneumatic spring, the lubricant is enclosed and fixed by at least one membrane. This membrane is destroyed only when the faces are pressed against each other.

14 Claims, 3 Drawing Figures

MECHANICAL SYSTEM COMPRISING TWO FACES MOVABLE WITH RESPECT TO EACH OTHER, AND A LUBRICANT THEREBETWEEN

BACKGROUND OF THE INVENTION

This invention relates to a mechanical system in which two faces are opposed to each other and are movable with respect to each other. During such movement, wear may occur. It is therefore necessary to provide a lubricant between said faces. The lubricant may have detrimental effects on the surroundings of the faces on which the lubricant is needed.

STATEMENT OF THE PRIOR ART

In pneumatic springs, talcum or silicone oil has been distributed on adjacent faces of a bellows which faces may come into mutual contact, in view of avoiding wear in case of relative movement of the faces being in mutual contact. The distribution of talcum or silicone oil has been rather difficult and time-consuming as it was necessary to avoid the contamination of other portions of the bellows with such talcum or silicone oil. More particularly, such contamination is to be avoided in the areas of the bellows which are to be fixed to adjacent parts of the pneumatic spring because by such contamination the fixation becomes ineffective.

In spite of all diligence, it has occurred in the past that portions of the bellows subject to the fixation were contaminated. Moreover, it was difficult in the past to distribute the lubricant so that all portions of the bellows subject to possible wear were covered with an adequate amount of lubricant.

OBJECT OF THE INVENTION

It is an object of the present invention to apply a lubricant in a mechanical system to two opposed faces such that the lubricant becomes effective as soon as the faces touch each other with a pressure exceeding a predetermined value and to avoid the contamination of adjacent portions in which the presence of the lubricant is undesirable. A further object of the present invention is to facilitate the distribution of the lubricant on the faces to be lubricated such that the amount of lubricant at each location corresponds to the required amount at said location.

SUMMARY OF THE INVENTION

A mechanical system comprises two faces opposed to each other along a first direction and is mounted for movement with respect to each other along at least one second direction, substantially perpendicular with respect to said first direction. A lubricant is provided on at least one of said faces.

In view of the above-defined objects, the lubricant is enclosed by at least one membrane, said membrane being destroyable in response to said faces being pressed against each other along said first direction. The destruction of the membrane may be aided also by the relative movement of said faces along said second direction.

According to a preferred embodiment of the present invention, the lubricant is enclosed in a plurality of microcapsules. The microcapsules are destroyed under pressure pressing said faces into mutual contact. The destruction is aided by shear forces resulting from relative movement of said faces. As long as the microcapsules are undestroyed, no lubricating effect is to be expected from the presence of the lubricant. As soon as the microcapsules are destroyed, the lubrication effect is achieved as desired.

By fixing the membrane to one of said faces, one can ensure that the lubricant remains at the desired location until the moment at which the lubricant is needed.

The microcapsules can easily be secured at the respective location to be lubricated by providing a binding agent which fixes the microcapsules with respect to each other and to the respective faces.

The lubricant to be used depends mostly on the material from which the respective faces are made. In case of rubberlike material as used for manufacturing bellows of pneumatic springs, talcum and silicone oil may be used as lubricants.

The technique of encapsulation is well known in the art. One method of microencapsulation is described in "Pharmazie in unserer Zeit", published by Verlag Chemie GmbH, D-6940 Weinheim, May 1984, pages 71 to 82. Further references are given in page 82.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
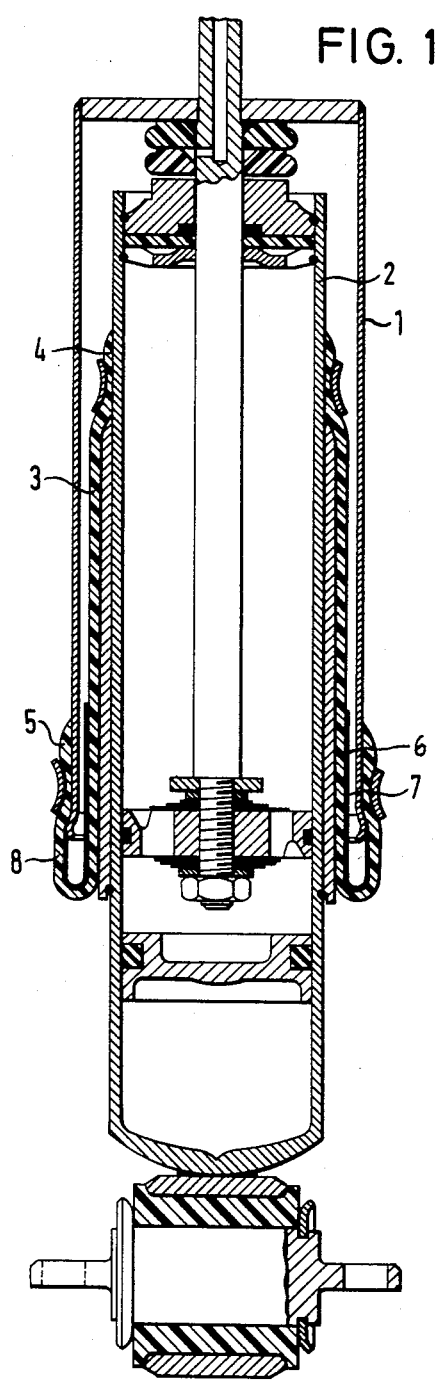
FIG. 1 shows a pneumatic spring of a motor vehicle comprising a bellows.

The pneumatic spring as shown in FIG. 1 is to be used in a motor vehicle between an axis and the frame of the motor vehicle. More particularly, FIG. 1 shows a single tube vibration damper with an air spring. As the construction and function of a single tube vibration damper and an air spring are well known in the art, no further description is necessary as to the basic construction and the function of the device shown in FIG. 1.

On cylinder 2 there is fixed one end portion 4 of a tubular air cushion bellows 3. The lower end 5 of the tubular air cushion bellows 3 is connected with an external tube 1 which is fixed to the piston rod. On relative movement of the piston rod and the cylinder in axial direction, the axial distance between the ends 4 and 5 of the tubular air cushion bellows 3 is varied. Due to this axial movement the overlapping faces of the air cushion bellows 3 are moved with respect to each other in the overlapping area 8. The air cushion bellows 3 may be made of a cylindrical tube and in such cases the distance between the overlapping faces and the overlapping area 8 is dependent on the pressure between the tube 1 and the air cushion bellows 3. If the pressure falls below a predetermined value, the radially inner face comes into contact with the radially outer face. As these faces move with respect to each other in axial direction on axial movement of the piston rod with respect to the cylinder, frictional wear occurs and this frictional wear would result in an early destruction of the bellows. In view of avoiding such early destruction, talcum or silicone oil are provided in the overlapping area 8. In assembling the device of FIG. 1, there is a risk of lubricant contamination beyond the overlapping area 8. Such lubricant contamination would be highly undesirable at the end portions of the bellows 3 where the bellows 3 is fixed to the cylinder 2 and the tube 1 because by such lubricant contamination the fixation becomes ineffective.

Figure 2:
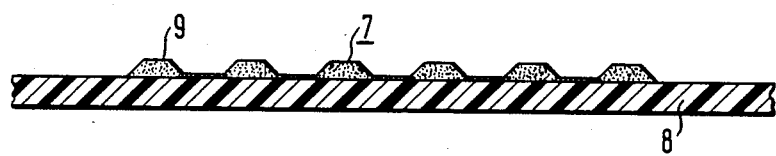
FIG. 2 shows a portion of the bellows of FIG. 1 provided with a lubricant, said lubricant being fixed by a membrane.

In order to prevent such lubricant contamination the lubricant is covered by a membrane 7. FIG. 2 shows an embodiment in which a coherent membrane is fixed to the bellows 8 and pockets 9 are defined between the bellows 8 and the membrane 7. These pockets 9 are filled with a lubricant like talcum or silicone oil. If opposed faces of the bellows 8 are pressed against each other in radial direction as seen in FIG. 1, and are possibly moved with respect to each other in axial direction, the membrane 7 is destroyed and the lubricant becomes free for lubricating the opposed faces. No contamination of the ends of the bellows 3 is to be expected, but even if such contamination occurs, it is not harmful because at this moment, the fixation of the ends of the bellows to the respective parts 2 and 1 has already been established, and no lubricant can enter between the portions fixed to each other.

Figure 3:
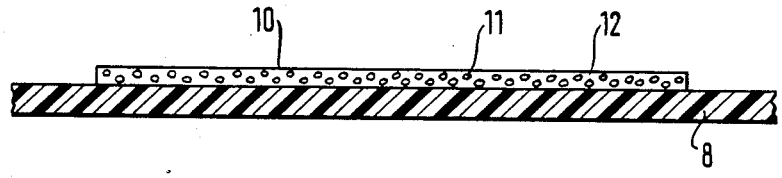
FIG. 3 shows a portion of the membrane on one face of which microcapsules are fixed, said microcapsules being filled with lubricant.

In FIG. 3, the bellows 8 is provided with a layer 10 of microcapsules 11. These microcapsules are fixed to each other and to the bellows 8 by a binding agent 12. The binding agent may comprise the same material as the capsules. The capsules 11 have a diameter of from 5 to 100 microns. They are filled with a lubricant like talcum or silicone oil.

For manufacturing the microcapsules, the lubricant is introduced into a solution of a polymer or a polycondensate. The lubricant is dispersed in the solution. In view of forming the membranes of the capsules, gel formation is initiated by the introduction of calcium ions. The polymer may be, for example, polyethyleneglycoleterephthalate.

For further information the micro-encapsulation we refer to the above-mentioned article in "Pharmazie in unserer Zeit" and to the literature mentioned therein.

It has been found that also highly viscous lubricants remain well distributed in the overlapping area until the lubrication effect is required.

The application of the microcapsules onto the bellows is performed according to well-known painting and spraying techniques.

While specific embodiments of the invention have been shown and described in detail to illustrate the application of the inventive principles, it will be understood that the invention may be embodied otherwise without departing from such principles.

What is claimed is:

1. A vibration damper comprising:
   a first cylindrical member defining a longitudinal axis;
   a second cylindrical member mounted so as to be substantially coaxial with respect to said first cylindrical member;
   said cylindrical members being telescopically disposed one inside the other and being mounted so as to permit relative reciprocatory movement therebetween along said axis;
   a tubular bellows having a first end portion connected to said first cylindrical member so as to conjointly define a first contact interface therewith and a second end portion connected to said second cylindrical member so as to conjointly defined a second contact interface therewith, said tubular bellows having an intermediate portion interconnecting said end portions thereof, said intermediate portion being folded over on itself to form a semi-toroidal folded portion and two subportions connecting said folded portion to corresponding ones of said end portions, the folded portion moving between said end portions in response to the reciprocatory movement of said cylindrical members thereby causing one subportion to become longer and the other subportion to become correspondingly shorter;
   said subportions being concentric so as to have mutually adjacent wall surfaces which come into pressure contact with each other during said movement of said cylindrical members;
   a lubricant disposed within a predetermined boundary entirely outside of said contact interfaces on at least one of said wall surfaces of said tubular bellows;
   lubricant fixing means for fixing and confining the lubricant to remain within said predetermined boundary during assembly of said unit whereby said lubricant is kept from reaching said contact interfaces during said assembly;
   said lubricating fixing means being responsive to said pressure contact for releasing said lubricant for lubricating said wall surfaces and protecting said subportions against wear after said assembly and during the operation of said unit; and,
   said fixing means being a membrane destroyable in response to the contact forces developed when said subportions come into pressure contact engagement with each other thereby releasing said lubricant.

2. The vibration damper of claim 1, said membrane being fixed to said one wall surface.

3. The vibration damper of claim 1, said lubricant being talcum.

4. The vibration damper of claim 1, said lubricant being silicone oil.

5. The vibration damper of claim 1, said cylindrical members conjointly defining a chamber for holding a fluid at a predetermined pressure; said subportions being adapted to be held in spaced relationship to each other so long as said predetermined pressure is maintained and to come into engaging contact with each other at said wall surfaces when said pressure drops below said predetermined pressure.

6. The vibration damper of claim 1, said boundary extending up to the end portion next to said one wall surface whereby said end portion is free of said lubricant.

7. A vibration damper comprising:
   a first cylindrical member defining a longitudinal axis;
   a second cylindrical member mounted so as to be substantially coaxial with respect to said first cylindrical member;
   said cylindrical members being telescopically disposed one inside the other and being mounted so as to permit relative reciprocatory movement therebetween along said axis;

a tubular bellows having a first end portion connected to said first cylindrical member so as to conjointly define a first contact interface therewith and a second end portion connected to said second cylindrical member so as to conjointly define a second contact interface therewith, said tubular bellows having an intermediate portion interconnecting said end portions thereof, said intermediate portion being folded over on itself to form a semi-toroidal folded portion and two subportions connecting said folded portion to corresponding ones of said end portions, the folded portion moving between said end portions in response to the reciprocatory movement of said cylindrical members thereby causing one subportion to become longer and the other subportion to become correspondingly shorter;

said subportions being concentric so as to have mutually adjacent wall surfaces which come into pressure contact with each other during said movement of said cylindrical members;

a lubricant disposed within a predetermined boundary entirely outside of said contact interfaces on at least one of said wall surfaces of said tubular bellows;

lubricant fixing means for fixing and confining the lubricant to remain within said predetermined boundary during assembly of said unit whereby said lubricant is kept from reaching said contact interfaces during said assembly;

said lubricating fixing means being responsive to said pressure contact for releasing said lubricant for lubricating said wall surfaces and protecting said subportions against wear after said assembly and during the operation of said unit; and, said lubricant being disposed in a plurality of microcapsules.

8. The vibration damper of claim 7, said fixing means comprising a binding agent for fixing said capsules to each other and for binding said capsules to said one wall surface.

9. The vibration damper of claim 7, said lubricant being talcum.

10. The vibration damper of claim 7, said lubricant being silicone oil.

11. The vibration damper of claim 7, said cylindrical members conjointly defining a chamber for holding a fluid at a predetermined pressure; said subportions being adapted to be held in spaced relationship to each other so long as said predetermined pressure is maintained and to come into engaging contact with each other at said wall surfaces when said pressure drops below said predetermined pressure.

12. The vibration damper of claim 7, said boundary extending up to the end portion next to said one wall surface whereby said end portion is free of said lubricant.

13. A vibration damper for motor vehicles which contains a fluid under pressure and is mountable between the bodywork and the axle of the vehicle, the vibration damper comprising:

an outer tube defining a longitudinal axis;

an inner tube being mounted so as to be at least partially within and substantially coaxial with respect to said outer tube;

guide means for guiding said outer tube for reciprocal movement along said axis with respect to said inner tube;

a tubular bellows having a first end portion connected to said outer tube so as to conjointly define a first contact interface therewith and a second end portion connected to said inner tube so as to conjointly define a second contact interface therewith, said tubular bellows having an intermediate portion interconnecting said end portions thereof, said intermediate portion being folded over on itself to form a semi-toroidal folded portion and two subportions connecting said folded portion to corresponding ones of said end portions, the folded portion moving between said end portions in response to the reciprocatory movement of said tubes thereby causing one subportion to become longer and the other subportion to become correspondingly shorter;

said subportions being concentric so as to have mutually adjacent wall surfaces which are held in spaced relationship to each other so long as said fluid is at a predetermined pressure and which come into contact engagement with each other in response to a drop in the pressure of said fluid beneath said predetermined pressure;

a lubricant disposed within a predetermined boundary entirely outside of said contact interfaces on at least one of said wall surfaces;

lubricant fixing means for fixing and confining the lubricant to remain within said predetermined boundary during assembly of said unit whereby said lubricant is kept from reaching said contact interfaces during said assembly;

said lubricating fixing means being responsive to the contact forces developed when said subportions come into said contact engagement with each other thereby causing said lubricant to be released for lubricating and protecting said subportions against wear after said assembly and during the operation of said damper; and, said fixing means being a membrane destroyable in response to the contact forces developed when said subportions come into contact engagement with each other.

14. A vibration damper for motor vehicles which contains a fluid under pressure and is mountable between the bodywork and the axle of the vehicle, the vibration damper comprising:

an outer tube defining a longitudinal axis;

an inner tube being mounted so as to be at least partially within and substantially coaxial with respect to said outer tube;

guide means for guiding said outer tube for reciprocal movement along said axis with respect to said inner tube;

a tubular bellows having a first end portion connected to said outer tube so as to conjointly define a first contact interface therewith and a second end portion connected to said inner tube so as to conjointly define a second contact interface therewith, said tubular bellows having an intermediate portion interconnecting said end portions thereof, said intermediate portion being folded over on itself to form a semi-toroidal folded portion and two subportions connecting said folded portion to corresponding ones of said end portions, the folded portion moving between said end portions in response to the reciprocatory movement of said tubes thereby causing one subportion to become longer and the other subportion to become correspondingly shorter;

said subportions being concentric so as to have mutually adjacent wall surfaces which are held in spaced relationship to each other so long as said fluid is at a predetermined pressure and which come into contact engagement with each other in response to a drop in the pressure of said fluid beneath said predetermined pressure;

a lubricant disposed within a predetermined boundary entirely outside of said contact interfaces on at least one of said wall surfaces;

lubricant fixing means for fixing and confining the lubricant to remain within said predetermined boundary during assembly of said unit whereby said lubricant is kept from reaching said contact interfaces during said assembly;

said lubricating fixing means being responsive to the contact forces developed when said subportions come into said contact engagement with each other thereby causing said lubricant to be released for lubricating and protecting said subportions against wear after said assembly and during the operation of said damper; and, said lubricant being disposed in a plurality of microcapsules; and, said fixing means including a binding agent for fixing said capsules to each other and for binding said capsules to said one wall surface.

* * * * *